United States Patent
Bostdorff

(10) Patent No.: US 9,295,201 B2
(45) Date of Patent: Mar. 29, 2016

(54) LIGHTING SYSTEM FOR PLANTS

(71) Applicant: FIREFLY-ONE, LLC, Bowling Green, OH (US)

(72) Inventor: Richard S. Bostdorff, Bowling Green, OH (US)

(73) Assignee: FIREFLY-ONE, LLC, Bowling Green, OH (US)

( * ) Notice: Subject to any disclaimer, the term of this patent is extended or adjusted under 35 U.S.C. 154(b) by 196 days.

(21) Appl. No.: 13/783,883

(22) Filed: Mar. 4, 2013

(65) Prior Publication Data

US 2013/0263503 A1    Oct. 10, 2013

Related U.S. Application Data

(60) Provisional application No. 61/620,125, filed on Apr. 4, 2012.

(51) Int. Cl.
*A01G 7/00* (2006.01)
*A01G 7/04* (2006.01)
*H05B 37/02* (2006.01)

(52) U.S. Cl.
CPC ............. *A01G 7/045* (2013.01); *H05B 37/02* (2013.01); *H05B 37/029* (2013.01)

(58) Field of Classification Search
CPC ........... A01G 7/045; A01G 7/04; A01G 9/14; A01G 9/20; A01G 9/26; A01G 9/00; A01G 9/143; A01G 7/00
USPC ............................................. 47/58.1 LS, 17
IPC ....................................................... A01G 7/04
See application file for complete search history.

(56) References Cited

U.S. PATENT DOCUMENTS

| 3,233,146 | A | 2/1966 | Vacha |
| 4,146,993 | A | 4/1979 | Freeman, Sr. |
| 2009/0151248 | A1* | 6/2009 | Bissonnette et al. ........... 47/59 S |
| 2009/0291485 | A1* | 11/2009 | Shigematsu et al. ....... 435/257.1 |
| 2011/0125296 | A1* | 5/2011 | Bucove et al. .................. 700/90 |
| 2011/0183368 | A1* | 7/2011 | Chapman et al. .............. 435/29 |

FOREIGN PATENT DOCUMENTS

| JP | 402128624 A | 5/1990 |
| JP | 404287618 A | 10/1992 |

OTHER PUBLICATIONS

Sheehan, "Flashlighting Chrysanthemums", 1961.*

* cited by examiner

*Primary Examiner* — Monica Williams
*Assistant Examiner* — Thien Thanh Pham
(74) *Attorney, Agent, or Firm* — Fraser Clemens Martin & Miller LLC; Jacob M. Ward

(57) ABSTRACT

A method for encouraging maturation and growth of a plant includes a provision of at least one stroboscopic lamp disposed adjacent the plant. The stroboscopic lamp is cycled through at least one on-period and at least one off-period for a predetermined cycling time. The plant is exposed to strobed high-intensity light during the at least one on-period, and not exposed to strobed high-intensity light during the at least one off-period. A maturation rate and the growth of the plant are thereby encouraged. A related system includes the at least one stroboscopic lamp and a controller for controlling the stroboscopic lamp according to the method, for encouraging maturation and growth of the plant.

6 Claims, 7 Drawing Sheets

LIGHTING SYSTEM FOR PLANTS

CROSS-REFERENCE TO RELATED APPLICATIONS

This application claims the benefit of U.S. Patent Application No. 61/620,125 filed on Apr. 4, 2012. The entire disclosure of the above application is hereby incorporated herein by reference.

FIELD OF THE INVENTION

This invention relates to systems and methods for promoting the growth and maturation rate of plants.

BACKGROUND OF THE INVENTION

Artificial lighting in green houses is known to promote the growth of plants. The artificial lighting is commonly used during periods of darkness and where there is insufficient natural lighting.

A common artificial lighting source used in green houses is a sodium-vapor lamp. However, sodium-vapor lamps consume undesirable amounts of electricity during their operation. Sodium-vapor lamps are also costly to manufacture and purchase. Consequently, the use of sodium-vapor lamps in green houses, on a consistent basis, is prohibitively expensive. It is also impractical to use sodium-vapor lamps outside of a green house environment such as in open fields where the plants may be cultivated.

Other known artificial lighting systems include JP 404287618 to Nakazawa, JP 402128624 to Ito et al., U.S. Pat. No. 4,146,993 to Freeman, Sr., and U.S. Pat. No. 3,233,146 to Vacha. Nakazawa describes stroboscopic application of short wavelength light to promote plant growth. Ito et al. describes a use of stroboscopic tubes when irradiating plants. Freeman, Sr. describes a practice of applying light in short bursts to stimulate plant growth. Vacha describes an electrical control of lighting when promoting plant growth.

There is a continuing need for a system and method for encouraging maturation and growth of plants such as vegetables, fruits, and ornamentals. Desirably, the system and method are inexpensive relative to the use of conventional sodium-vapor lighting, and increase a rate of maturation of the plants.

SUMMARY OF THE INVENTION

In concordance with the instant disclosure, a system and method for encouraging maturation and growth of plants such as vegetables, fruits, and ornamentals, and which are inexpensive relative to the use of conventional sodium-vapor lighting, and increase a rate of maturation of the plants, has surprisingly been discovered.

In an exemplary embodiment, a system for encouraging maturation and growth of plants includes stroboscopic lamps disposed above the plants. The stroboscopic lamps produce periodic flashes of light having a high intensity (e.g., up to 175,000 peak candle power or greater). Clear and transparent lenses or colored lenses may cover the stroboscopic lamps. The stroboscopic lamps produce light in a wavelength that may be used by the plants (e.g., 450-950 nanometer). The stroboscopic lamps are typically suspended above the plants and connected to a controller, which controls the stroboscopic lamps.

In operation, when natural lighting is not yet available in the morning and evening, the stroboscopic lamps are cycled through alternating on-periods (e.g., 2 minutes) and off-periods (e.g., 20 minutes) for a predetermined cycling time (e.g., 1-½ hours). The length and number of on-periods, the length and number of off-periods, and the total length of the predetermined cycling time, may be modified based upon the plant species being exposed. It has been shown that the exposure of plants to the stroboscopic lamp cycling results in an increased rate of maturation and growth of the plants. The system and method is inexpensive to manufacture and operate compared to known lighting systems such as sodium-vapor lamps.

Unexpectedly, where stroboscopic lamps are cycled through alternating on-periods and off-periods for a predetermined cycling time, the rate of maturation of plants exposed to the stroboscopic lighting has been shown to increase. It has also been surprisingly found that different plants may benefit from the cycling of the stroboscopic lamps through different lengths of alternating on-periods and off-periods.

In one embodiment, a method for encouraging maturation and growth of a plant includes the provision of at least one stroboscopic lamp disposed adjacent the plant. The stroboscopic lamp is then cycled through at least one on-period and at least one off-period for a predetermined cycling time. The plant is exposed to strobed high-intensity light during the at least one on-period, and not exposed to strobed high-intensity light during the at least one off-period. A maturation rate and the growth of the plant are thereby encouraged.

In another embodiment, a system for encouraging maturation and growth of a plant includes at least one stroboscopic lamp adapted to be disposed adjacent the plant. A controller is in communication with the stroboscopic lamp. The controller controls the at least one stroboscopic lamp, and is configured to cycle the stroboscopic lamp through at least one on-period and at least one off period for a predetermined cycling time.

In a further embodiment, a method for encouraging maturation and growth of a plant includes a provision of at least one stroboscopic lamp suspended above the plant. The stroboscopic lamp produces a strobed high-intensity light in a wavelength between about 450 nanometers and about 950 nanometers. The strobed high-intensity light is greater than about 100,000 peak candela, and is between about 25 and about 150 flashes per minute. The stroboscopic lamp is then cycled through a first predetermined cycling time including at least one on-period and at least one off-period. The plant is exposed to the strobed high-intensity light from the stroboscopic lamp during the at least one on-period. The plant is not exposed to the strobed high-intensity light from the stroboscopic lamp during the at least one off-period. An exposure of the plant to the strobed high-intensity light from the stroboscopic lamp is then ceased for one of a daytime period and an evening period. Following the daytime period or the evening period, the stroboscopic lamp is then cycled through a second predetermined cycling time including the at least one on-period and the at least one off-period, The predetermined period of time for the at least one on-period is between about 1 percent and about 20 percent of the predetermined period of time for the at least one off-period. The predetermined cycling time is between about 20 minutes and about four hours.

BRIEF DESCRIPTION OF THE DRAWINGS

The above, as well as other advantages of the present invention, will become readily apparent to those skilled in the art from the following detailed description of a preferred embodiment when considered in the light of the accompanying drawings including charts, graphs, tables, product specifications, and photographs.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

Figure 1:
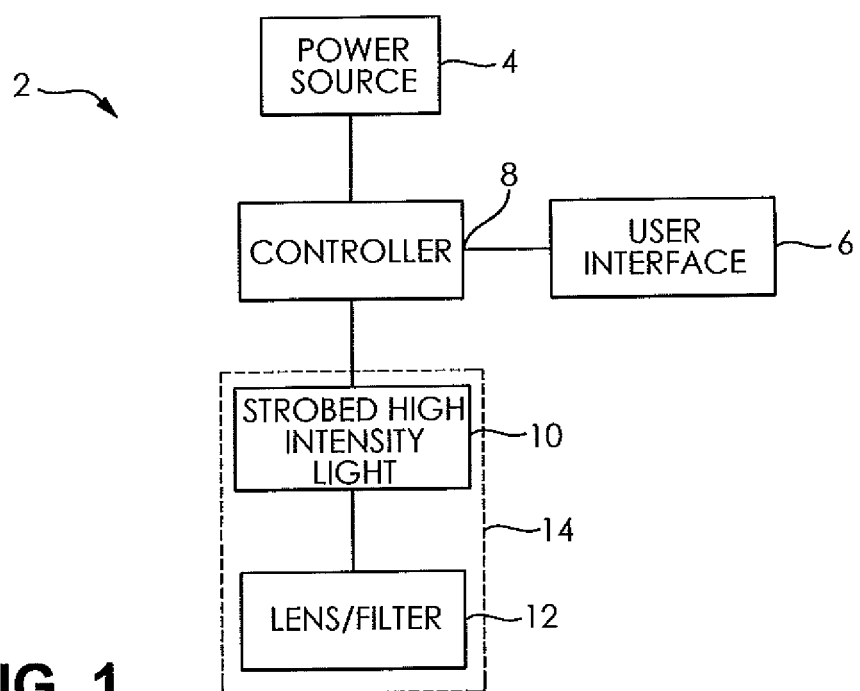
FIG. 1 is a schematic diagram of a system for providing high-intensity stroboscopic light to a plant according to one embodiment of the disclosure.

In FIG. 1, a system 2 for encouraging the maturation and the growth of a plant 20 is disclosed. In particular embodiments, the plant 20 may include one of a vegetable plant, a fruit-bearing plant, and ornamentals. It should be understood that other types of plants 20 may also be cultivated using the system 20 of the present disclosure, as desired.

Figure 2:
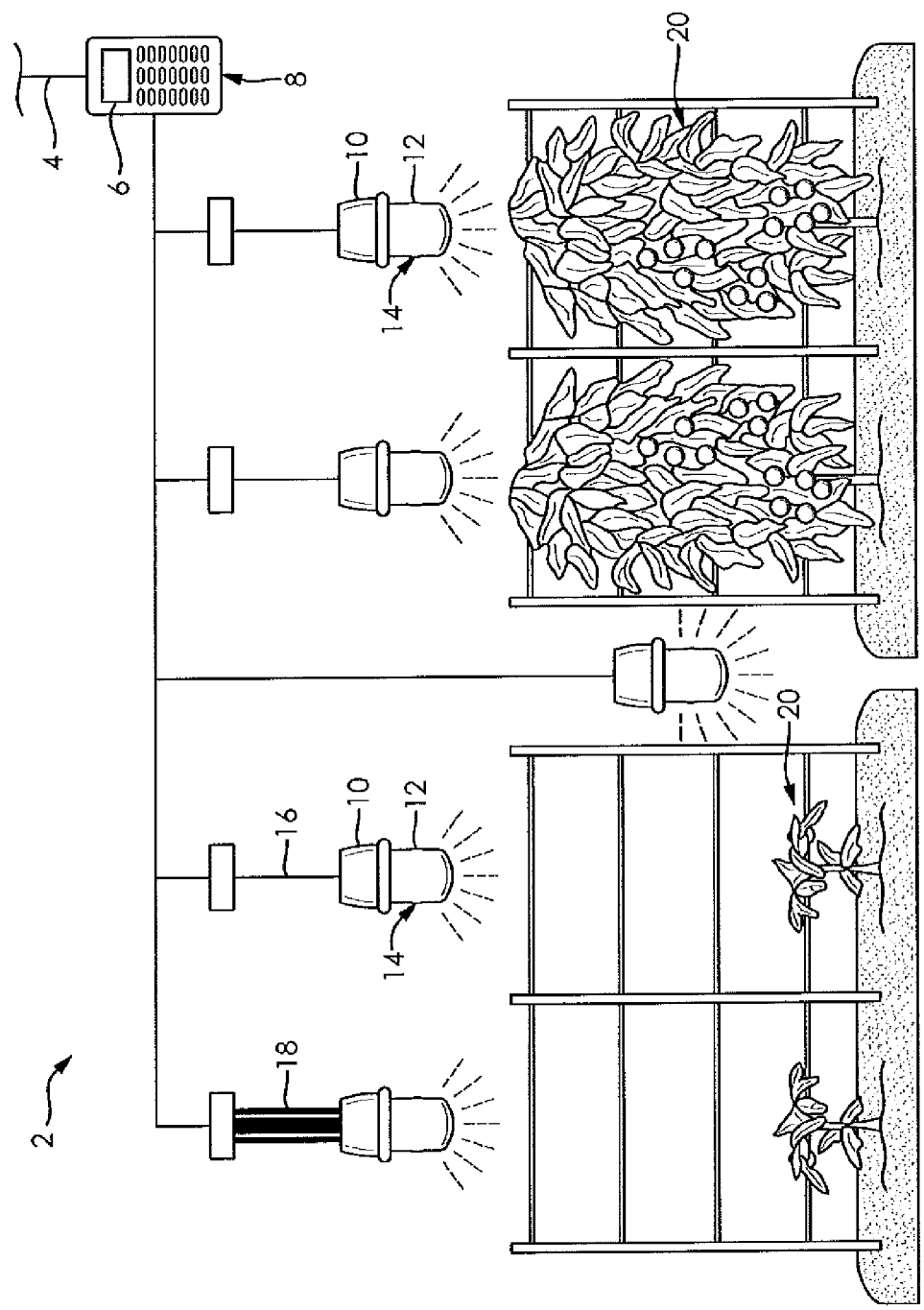
FIG. 2 is an illustration of a particular embodiment of a system for providing high-intensity stroboscopic light to a plant.

The system 2 includes an at least one stroboscopic lamp 14 disposed adjacent to the plant 20. In certain embodiments, and as illustrated in FIG. 2, the at least one stroboscopic lamp 14 is suspended above the plant 20. In some examples, the at least one stroboscopic lamp 14 may be suspended with a non-rigid connector 16 such a cord, cable, strap, or chain, as non limiting examples. In other examples, the at least one stroboscopic lamp 14 may be suspended above the plant 20 with a rigid connector 18 such as a bracket. Other suspension means may also be used to dispose the stroboscopic lamp 14 adjacent the plant 20. The stroboscopic lamp 14 may also be disposed to a side of the plant 20, or underneath the plant 20, as desired. Other locations for the stroboscopic lamp 14 relative to the plant 20 may also be used within the scope of the disclosure.

The system 2 may include a plurality of the stroboscopic lamps 14 disposed above a plurality of the plants 20. Each of the stroboscopic lamps 14 may be independently operated, or may be operated in unison, as desired. The system 2 may be employed in a greenhouse, for example, where the plants 20 are being cultivated. The system 2 may also be employed in other areas where the plants 20 are being cultivated, for example, in an open field in which the system 2 has been deployed. Where the system 2 is used in the open field, the stroboscopic lamps 14 may be suspended from stakes driven into the ground, or hung from a framework disposed over the plants 20 in the field. One of ordinary skill in the art may select alternative means for disposing the stroboscopic lamps 14 adjacent the plants 20, as desired.

The system 2 also includes a controller 8 connected to a power source 4 for controlling the at least one stroboscopic lamp 14. The controller 8 is configured to cycle the stroboscopic lamp 14 through an at least one on-period 112 and the at least one off-period 114 for a predetermined cycling time 110. In particular embodiments, the controller 8 permits a user to select a total predetermined cycling time 110 and a predetermined period of time 106, 108 for each of at least one on-period 112 and at least one off-period 114 (shown in FIGS. 5-6).

In a particular embodiment, the controller 8 includes a processor for receiving processor executable instructions. The processor may control the predetermined cycling time 110 and the predetermined period of time 106, 108 for each of the at least one on-period 112 and at least one off-period 114, in accordance with the processor executable instructions. The controller 8 may further include a tangible, non-transitory computer-readable storage medium in which the processor executable instructions are stored or otherwise embodied. The processor may be in communication with the computer-readable storage medium, for purposes of executing the processor executable instructed embodied thereon. It should be appreciated that other types of controllers 8 may also be used within the scope of the disclosure.

The controller 8 may also be in communication with at least one sensor (not shown), which may inform when the predetermined cycling time 110 is to begin or end. For example, the at least one sensor may be a photosensitive eye or light sensor that detects the presence of a sufficient amount of natural lighting where the at least one stroboscopic lamp 14 may be cycled off, or a presence of an insufficient amount of natural lighting where the at least one stroboscopic lamp 14 may be cycled on. In other embodiments, the at least one sensor measures an absence of a sufficient amount of moisture or water in the plant 20 environment, in which case the exposure to the strobed high-intensity lighting is minimized to militate against an undesirable drying of the plant 20. Other types of sensors may also be in communication with the controller 8, as desired.

Figure 4:
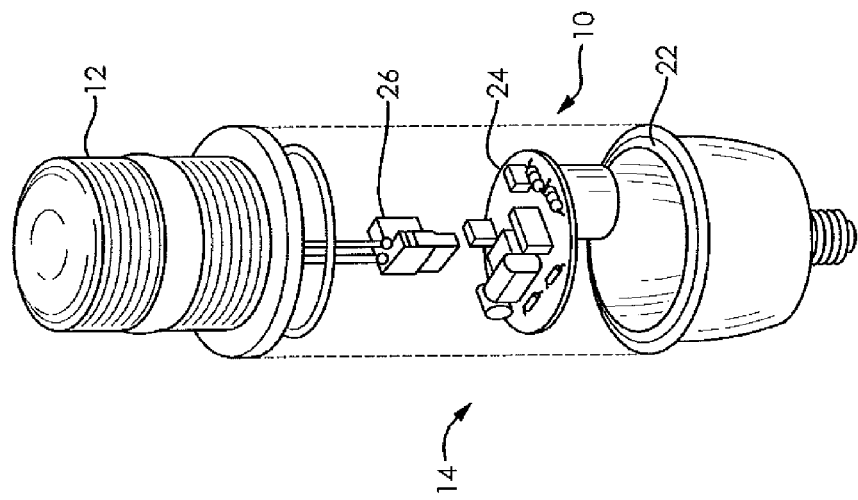
FIG. 4 is an exploded perspective view a stroboscopic lamp according to one embodiment of the disclosure.
Figure 3:
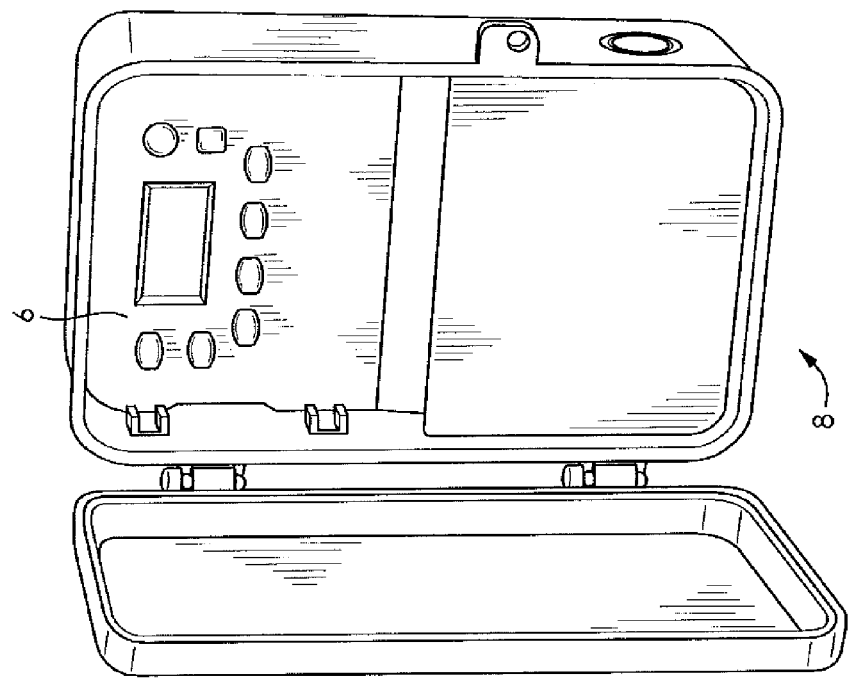
FIG. 3 is a perspective view of a controller for operating a stroboscopic lamp according to one embodiment of the disclosure.

The system 2 may also include a user interface 6 in communication with the controller 8, for example, as shown in FIGS. 1-3. The user interface 6 may permit the user to select the predetermined cycling time 110 and the predetermined period of time 106, 108 for each of the at least one on-period 112 and at least one off-period 114. The user interface 6 may include a keyboard or a touch screen, for example. The user interface 6 may also have controls such as buttons, dials, knobs, or the like, as well as readouts such as timers, gauges, and video screens with information corresponding to the predetermined cycling time 110 and the predetermined period of time 106, 108 for each of the at least one on-period 112 and at least one off-period 114. In a particular instance, the user interface 6 is in communication with at least one of the processor and the computer-readable storage medium, and may permit the user to provide or modify the processor executable instructions for operating the at least one stroboscopic lamp 14. Other types of user interfaces 6 may also be employed, as desired, The stroboscopic lamp 14, for example, as shown in FIG. 4, is selected so as to provide a desired intensity, frequency, and wavelength of light to the plant 20. The intensity, the frequency, and the wavelength of the light may be selected based on specific needs of the species of the plant 20 with which the system 2 is used. Likewise, the stroboscopic lamp 14 of the system 2 may be modified or customized to be used with different species of the plant 20. One of ordinary skill in the art may select the intensity, the frequency, and the wavelength of the light provided by the stroboscopic lamp 14, as desired.

In a nonlimiting example, the stroboscopic lamp 14 is comprised of a strobed high-intensity light apparatus 10 and a lens 12. The strobed high-intensity light apparatus 10 includes a mounting base 22, a circuit board assembly 24, and a strobe tube 26. The mounting base 22 may include one of an Edison thread, a pipe thread, and a flush mount, as nonlimiting examples. The types of circuit board assembly 24 and strobe tube 26 may be selected by a skilled artisan based on the intended installation of the stroboscopic lamp 14, and desired application of the system 2 to particular species of the plant 20.

As nonlimiting examples, the stroboscopic lamp 14 generates strobed high-intensity light that is greater than about 100,000 peak candela, more particularly greater than about 150,000 peak candela, and most particularly at least about 175,000 peak candela, In other examples, the strobed high-intensity light is between about 25 and 150 flashes per minute, more particularly between about 50 and 100 flashes per minute, and most particularly between about 65 and 95 flashes per minute. Different types of the stroboscopic lamp 14 having a different desired intensity and frequency may also be used within the scope of the present disclosure.

The wavelength of the strobed high-intensity light is also selected to be a wavelength suitable for use by the plant 20. For example, the lens 12 color of the stroboscopic lamp 14 is selected depending on the desired wavelength to be emitted. In a most particular example, the wavelength is between about 450 nanometers and 950 nanometers when the strobed high-intensity light 10 is discharged through a clear lens 12. In a particular example, the strobed high-intensity light 10 is directed through an amber lens 12 to discharge a wavelength between about 550 nanometers and 950 nanometers. One of ordinary skill in the art will appreciate that a variety of wavelengths may be produced by varying any one of a combination of lens 12 color and the actual wavelength of the strobed high-intensity light.

In an exemplary embodiment, the lens 12 of the stroboscopic lamp 14 is removably attached to the stroboscopic lamp 14, and permits a customization of the wavelength of the light to be provided by the system 2. The lens 12 may include one of a clear and amber colored lens 12, for example. Other colors of the lens 12 may also be used within the scope of the present disclosure.

In addition to selecting a desired intensity, frequency, and wavelength, the stroboscopic lamp 14 can also be located at alternative distances from the subject plant 20. The stroboscopic lamp 14 may be located closer to the plant 20 to increase light concentration for the plant 20. The stroboscopic lamp 14 may likewise be located farther from the plant 20 to decrease light concentration for the plant 20. Where the stroboscopic lamp 14 is located farther from the plant 20, it should be appreciated that a single stroboscopic lamp 14 may provide lighting to a broader area and more of the plants 20, at a lower intensity.

Figure 5:
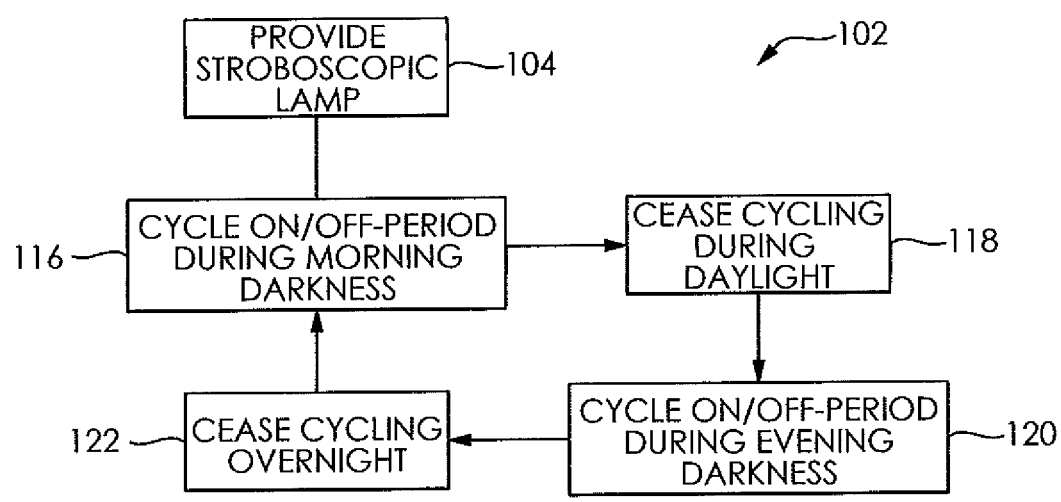
FIG. 5 is a flow diagram illustrating a method of providing high-intensity stroboscopic light to a plant in accordance with one embodiment of the present disclosure.

The present disclosure includes a method 102 for promoting the growth and maturation of the plants 20. As shown in FIG. 5, the method 102 for encouraging maturation and growth of a plant 20 includes a provision 104 of at least one stroboscopic lamp 14 disposed adjacent the plant 20. The at least one stroboscopic lamp 14 may be provided as part of the system 2, described hereinabove.

In operation, the stroboscopic lamp 14 is cycled on and off during a morning period 116 and an evening period 120, in each of which there is substantially no natural light available to the plant 20. Where the stroboscopic lamp 14 is cycled on, the stroboscopic lamp 14 is active or powered and the cycling includes a plurality of flashes of the strobed high-intensity light, at a rate of between about 25 and 150 flashes per minute, for example, as previously discussed hereinabove. Where the stroboscopic lamp 14 is cycled off, the stroboscopic lamp 14 is inactive or unpowered, and discharges no light to the plant 20.

It should be appreciated that the subjecting of the plant 20 to the period of darkness in the overnight hours 122, as well as the provision of the at least one off-period 114 during the cycling of the at least one on-period 112 and the at least one off-period 114 where the stroboscopic lamp 14 is cycled on, provides necessary resting periods for the plants 20, and advantageously contributes to the promoted growth and maturation of the plants 20 under the present method 102.

Figure 6:
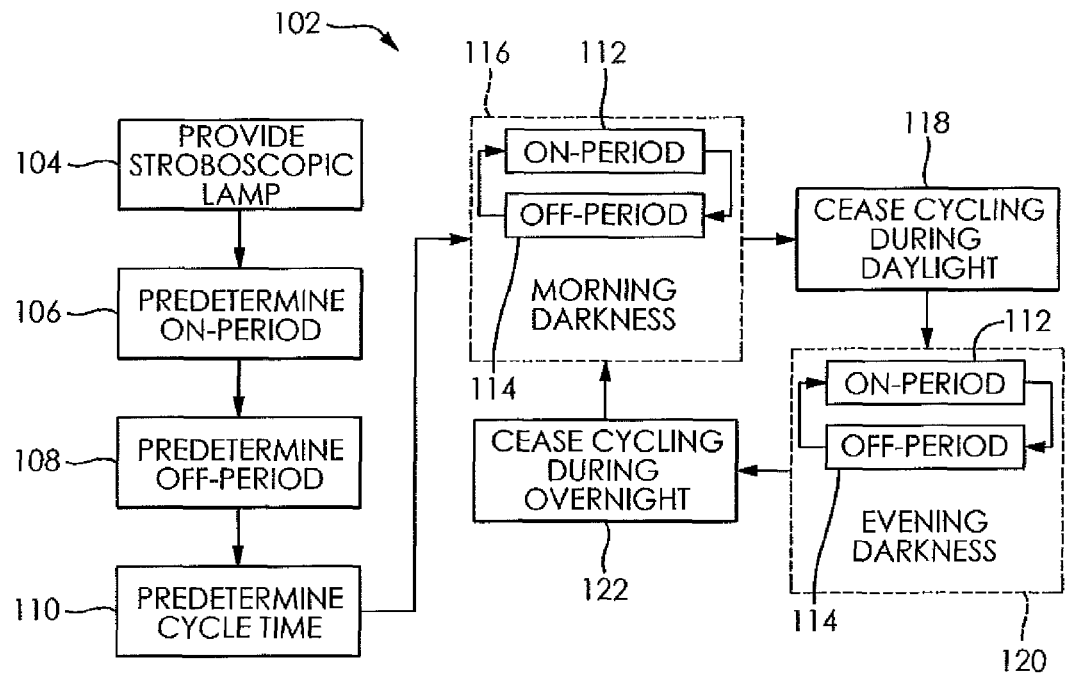
FIG. 6 is a flow diagram illustrating a method of providing high-intensity stroboscopic light to a plant using predetermined settings.

FIG. 6 further illustrates the method 102 of the present disclosure, where each of the morning period 116 and the evening period 120 includes the at least one on-period 112 and the at least one off-period 114. The at least one on-period 112 and the at least one off-period 114 are each performed for a predetermined period of time 106, 108.

It should be understood that the predetermined period of time 106 for the at least one on-period 112 may be a fraction of the predetermined period of time 108 for the at least one off-period 114. In a particular embodiment, the predetermined period of time 106 for the at least one on-period 112 is between 1 percent and 20 percent of the predetermined period of time 108 for the at least one off-period 114, in a more particular embodiment between 5 percent and about 15 percent, and in a most particular embodiment about 10 percent. In a most particular example, the predetermined period of time 106 for the alternating on-periods 112 is about 2 minutes and the predetermined period of time 108 for the alternating off-periods 114 is about 20 minutes. Other predetermined periods of time 106, 108 for the at least one on-period 112 and the at least one off-period 114 may also be employed within the scope of the present disclosure.

The cycling of the stroboscopic lamp 14 for the predetermined cycling time 110 may be performed during each of the morning 116 and the evening 120, and cease during each of the daytime 118 and overnight 122 hours, allowing the plant 20 to be exposed to natural daylight and darkness, respectively. The cycling 116, 120 may be performed where there is substantially no natural daylight, for example. The predetermined cycling time 110 for the cycling of the stroboscopic lamp 14 between the at least one on-period 112 and the at least one off-period 114 may be between 20 minutes and 4 hours, more particularly between 45 minutes and 3 hours, and most particularly about 1 hour and 30 minutes. Favorable results have also been found where the predetermined cycling time 110 is about 3 hours. One of ordinary skill in the art may select alternative predetermined cycling times 110, as desired.

In a particular embodiment of the method 102, the predetermined duration 106 of the on-period 112, the predetermined duration 108 of the off-period 114, and the predetermined duration 110 of the cycles 116, 120 are selected such that the on-period 112 and off-period 114 alternate for the entire predetermined duration 110 of the cycles 116, 120. In a most particular example, each on-period 112 is about 2 minutes and each off-period 114 is about 20 minutes. The periods 112, 114 are repeated continuously during the predetermined cycle time 110.

One of ordinary skill in the art will appreciate that the number of completed cycles will vary as each of the duration on-period 106, duration of the off-period 108, and duration of the cycle time 110 is adjusted. It will also be appreciated that the predetermined cycle time 110 for each of the morning darkness cycle 116 and evening darkness cycle 120 can be unique, with the user assigning an exclusive cycle time for each, as desired.

EXAMPLES

Figure 7:
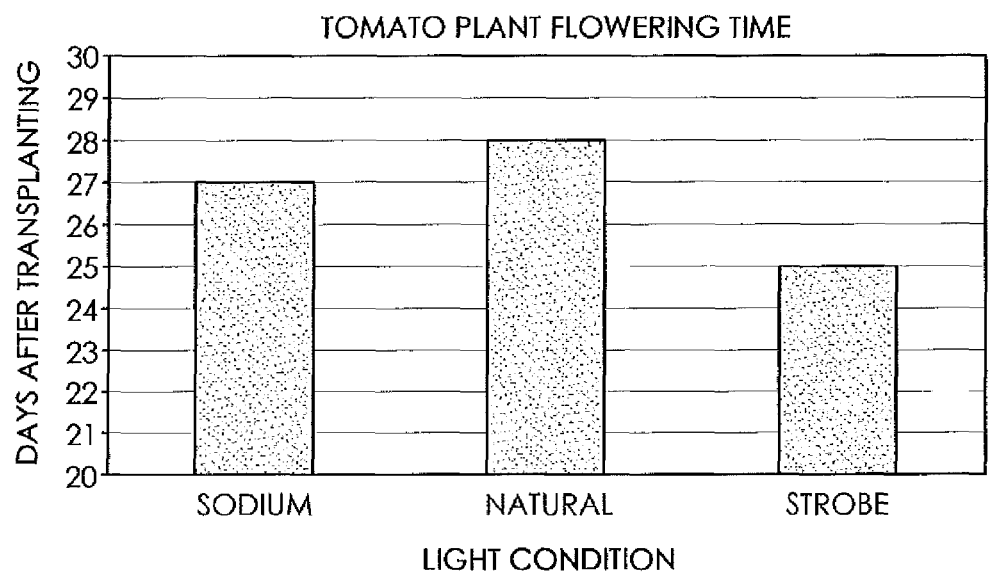
FIG. 7 is a bar graph illustrating the reduction in flowering time achieved by using the system and method of the present disclosure.

FIG. 7 shows a bar graph representing average flowering time of tomato plants for three different light sources: Sodium-vapor; natural; and stroboscopic. In this example, three (3) plants of each of seven (7) species were tested under each of the three different lighting sources, giving twenty-one (21) plants per light source, and a total of sixty-three (63) plants.

All exposures to stroboscopic lighting in the example of FIG. 7 were performed according to the method of the present disclosure, using stroboscopic lamps producing light in a wavelength of 450-950 nanometers, having a peak candela of about 175,000, and a flash rate of about 65-95 flashes per minute. The stroboscopic lamps were suspended above the plants and, when natural lighting was not yet available in the morning and evening hours, the stroboscopic lamps were cycled through alternating on-periods of about 2 minutes and off-periods of about 20 minutes for a predetermined cycling time of about 1-½ hours. Sodium-vapor lighting was also performed for a time of about 1-½ hours in the morning and evening hours, for purposes of comparison.

As shown in FIG. 7, the plants subjected to stroboscopic lighting had an average flowering time of 25 days. This is an improvement over the 27 and 28 day averages for plants subjected to sodium-vapor and natural light sources, respectively.

Figure 8:
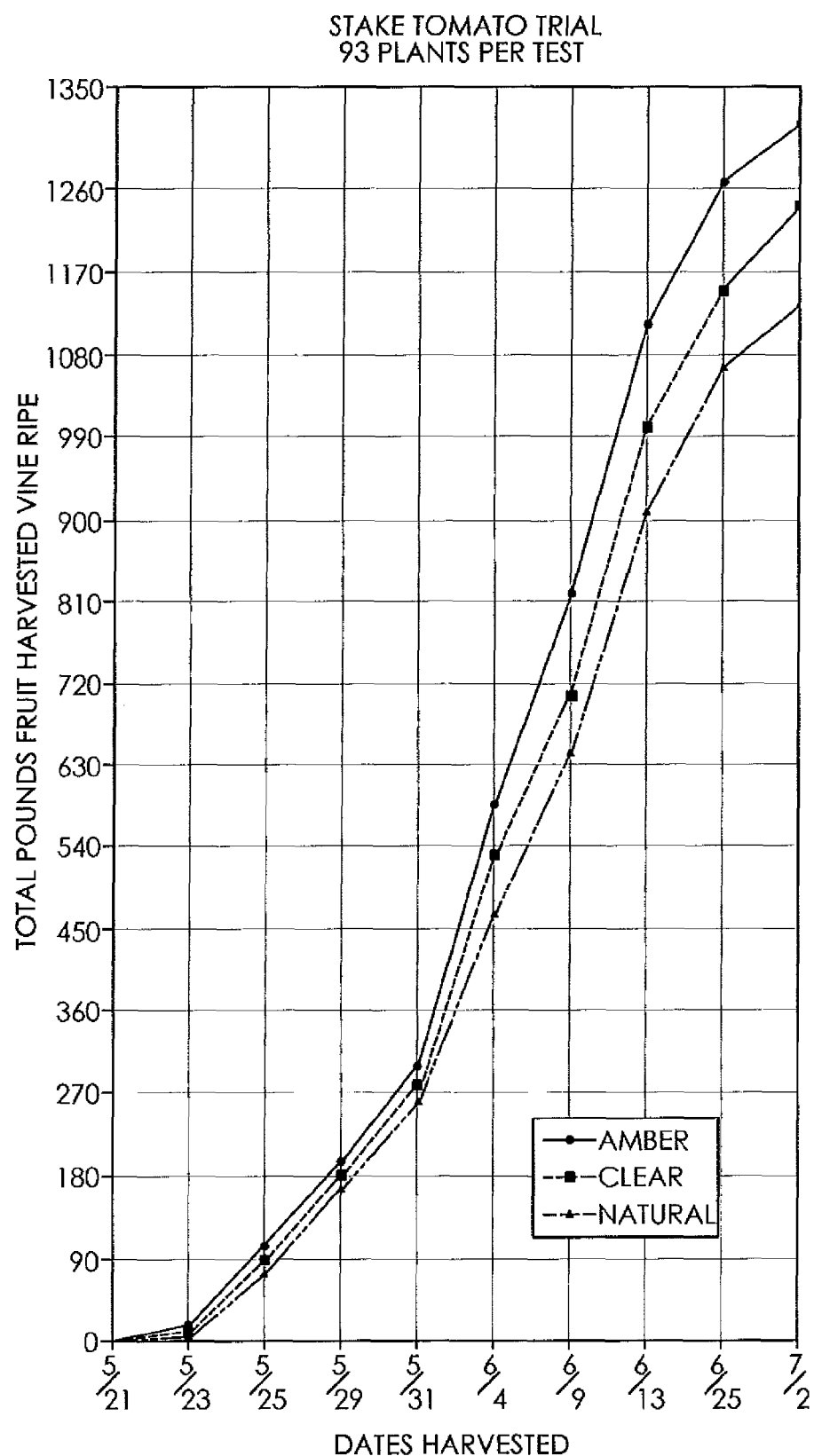
FIG. 8 is a line graph illustrating the relationship between lens color and total harvest weight using the system and method of the present disclosure.

FIG. 8 shows a line graph representing total cumulative pounds of fruit harvested on specified harvest dates for tomato plants subjected to stroboscopic and natural light sources. Data was collected for two different colored lenses: Amber (dotted line, dot markers) and Clear (dashed line, square markers), as well as for natural lighting (solid line, triangle markers). The Amber lens provided filtered strobed lighting of wavelengths associated with the Amber color, with the Clear lens providing unfiltered strobed light having a wavelength above about 450 nanometers. Each of the light sources was tested on ninety-three (93) tomato plants of the same species, planting date, and growing conditions.

All exposures to stroboscopic lighting in the example of FIG. 8 were performed according to the method of the present disclosure, using stroboscopic lamps having a peak candela of about 175,000, and a flash rate of about 65-95 flashes per minute. The stroboscopic lamps were suspended above the plants and, when natural lighting was not yet available in the morning and evening hours, the stroboscopic lamps were cycled through alternating on-periods of about 2 minutes and off-periods of about 20 minutes for a predetermined cycling time of about 3 hours.

As shown in FIG. 8, the plants subjected to stroboscopic light from an Amber colored lens yielded about 1,320 pounds of tomato fruit, and the plants subjected to stroboscopic light through a Clear lens yielded about 1,230 pounds of tomato fruit. Both forms of stroboscopic light provided an improvement over the plants subjected to only natural lighting, which yielded only about 1,140 pounds of fruit over the same period of time.

Figure 9:
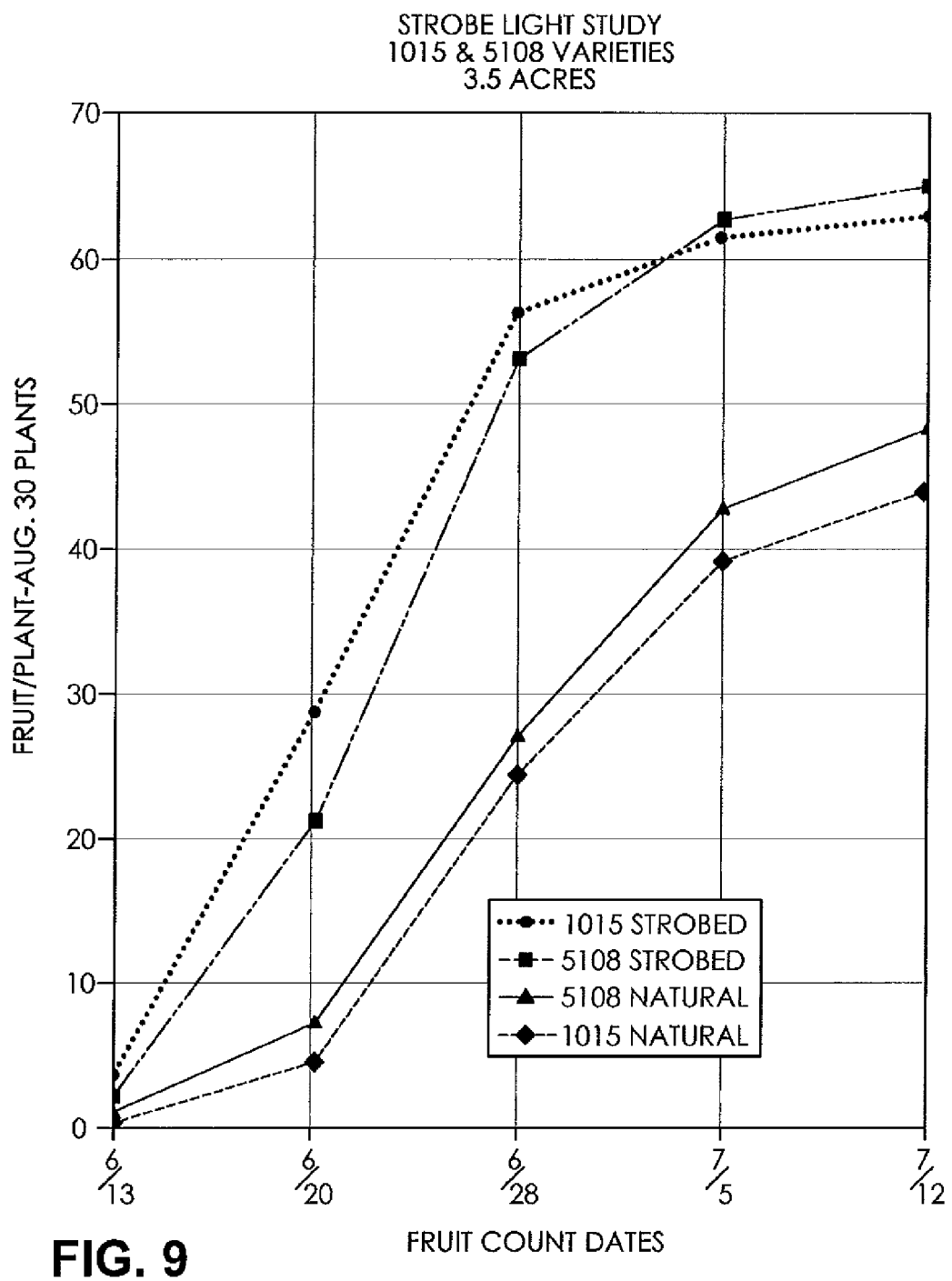
FIG. 9 is a line graph illustrating the relationship between fruit population per plant and light conditions using the system and method of the present disclosure.

FIG. 9 shows a line graph representing a comparison of cumulative fruits counted per plant for plants subjected to stroboscopic and natural light sources over a one month period. Data was collected for three sample sets: 1015 variety tomatoes exposed to stroboscopic light (dotted line, dot markers); 1015 variety tomatoes exposed to no strobed light, merely natural lighting (dashed line, diamond markers); 5108 variety tomatoes exposed to stroboscopic light (phantom line, square markers); and 5108 variety tomatoes exposed to no stroboscope light, merely natural lighting (solid line, triangle markers).

All exposures to stroboscopic lighting in the example of FIG. 9 were performed according to the method of the present disclosure, using stroboscopic lamps producing light in a wavelength of 450-950 nanometers, having a peak candela of about 175,000, and a flash rate of about 65-95 flashes per minute. The stroboscopic lamps were suspended above the plants and, when natural lighting was not yet available in the morning and evening hours, the stroboscopic lamps were cycled through alternating on-periods of about 2 minutes and off-periods of about 20 minutes for a predetermined cycling time of about 3 hours.

As shown in FIG. 9, there was a substantial increase in the quantity of fruits counted for both the 1015 and 5108 tomato varieties. The 1015 variety yielded 63 fruit/plant when exposed to stroboscopic light, compared to only 44 fruit/plant counted from the 1015 variety exposed to natural lighting. Likewise, the 5108 variety yielded 65 fruit/plant when exposed to stroboscopic light, compared to only 48 fruit/plant when only exposed to natural lighting.

Surprisingly, and as established in the examples hereinabove, the system 2 and method 102 of the present disclosure encourages maturation and growth of the plants 20, such as vegetables, fruits, and ornamentals. Advantageously, the system 2 and method 102 are also inexpensive relative to the use of conventional sodium-vapor lighting systems and methods.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A method for encouraging maturation and growth of a plant, the method comprising the steps of:

providing a system including at least one stroboscopic lamp disposed adjacent the plant, the stroboscopic lamp having a strobe tube for producing a strobed high-intensity light in a wavelength between 450 nanometers and 950 nanometers, an intensity of greater than about 100,000 peak candela, and a flash rate between about 25 and about 150 flashes per minute, and a controller in communication with and controlling the at least one stroboscopic lamp, the controller having a user interface;

permitting a user to select, by the user interface of the controller, a first predetermined cycling time for the stroboscopic lamp and a second predetermined cycling time for the stroboscopic lamp, each of the first predetermined cycling time and the second predetermined cycling time having a plurality of alternating on-periods and off-periods, and each of the on-periods and each of the off-periods further having a predetermined period of time, the predetermined period of time for each of the on-periods being a fraction of the predetermined period of time for each of the off-periods;

cycling, by the controller, the stroboscopic lamp through the first predetermined cycling time during a morning darkness period where natural lighting is not available;

ceasing an exposure of the plant to the strobed high-intensity light from the stroboscopic lamp during a daytime period where the natural lighting is available, the daytime period occurring after the morning darkness period;

cycling, by the controller, the stroboscopic lamp through the second predetermined cycling time during an evening darkness period where the natural lighting is not available, the evening darkness period occurring after the daytime period; and ceasing an exposure of the plant to the strobed high-intensity light from the stroboscopic lamp during an overnight period where the natural lighting is not available, the overnight period occurring between the evening darkness period and the morning darkness period, wherein the plant is exposed to the strobed high-intensity light from the stroboscopic lamp having the flash rate between about 25 and about 150 flashes per minute during the on-periods and not exposed to the strobed high-intensity light from the stroboscopic lamp during the off-periods, thereby encouraging the maturation and the growth of the plant.

2. The method of claim 1, wherein the predetermined period of time for each of the on-periods is between about 1 percent and about 20 percent of the predetermined period of time for each of the off-periods.

3. The method of claim 1, wherein each of the first predetermined cycling time and the second predetermined cycling time is between about 20 minutes and about four hours.

4. The method of claim 1, wherein strobed high-intensity light is directed through one of a clear lens and a colored lens to the plant.

5. The method of claim 1, wherein the stroboscopic lamp is suspended above the plant.

6. The method of claim 1, wherein the strobed high-intensity light is about 175,000 peak candela and the flash rate of the strobed high-intensity light is between about 65 and about 95 flashes per minute.

\* \* \* \* \*